US012141103B2

(12) United States Patent
Singh et al.

(10) Patent No.: US 12,141,103 B2
(45) Date of Patent: Nov. 12, 2024

(54) FILE SYSTEM METADATA LAYOUT FOR APPEND-ONLY STORAGE

(71) Applicant: MICROSOFT TECHNOLOGY LICENSING, LLC, Redmond, WA (US)

(72) Inventors: Neeraj Kumar Singh, Seattle, WA (US); Rajsekhar Das, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 145 days.

(21) Appl. No.: 17/844,624

(22) Filed: Jun. 20, 2022

(65) Prior Publication Data

US 2023/0409536 A1    Dec. 21, 2023

(51) Int. Cl.
*G06F 16/18* (2019.01)
*G06F 16/14* (2019.01)

(52) U.S. Cl.
CPC .......... *G06F 16/1805* (2019.01); *G06F 16/14* (2019.01)

(58) Field of Classification Search
CPC .................................................. G06F 16/1805
See application file for complete search history.

(56) References Cited

U.S. PATENT DOCUMENTS

| 11,023,318 B1* | 6/2021 | Volkov ................. G06F 16/1805 |
| 11,144,394 B1* | 10/2021 | Wang .................. G06F 11/1004 |
| 11,144,524 B2 | 10/2021 | Aron et al. |
| 2015/0356125 A1* | 12/2015 | Golander ............ G06F 16/1805 707/620 |
| 2017/0277713 A1 | 9/2017 | Strauss et al. |
| 2020/0202041 A1* | 6/2020 | Li ......................... H04L 9/3247 |
| 2020/0349121 A1 | 11/2020 | Lee et al. |
| 2021/0141775 A1 | 5/2021 | Keymolen et al. |

(Continued)

OTHER PUBLICATIONS

"International Search Report and Written Opinion Issued in PCT Application No. PCT/US23/022446", Mailed Date: Sep. 15, 2023, 10 Pages.

(Continued)

*Primary Examiner* — Robert W Beausoliel, Jr.
*Assistant Examiner* — Nirav K Khakhar
(74) *Attorney, Agent, or Firm* — Newport IP, LLC; Jacob P. Rohwer

(57) ABSTRACT

The techniques disclosed herein enable systems to store file system metadata on append-only storage devices by the introduction of a metadata layout and relative references. To achieve this, a system analyzes a file metadata structure to select an approach to storing the metadata structure on the storage device. If the metadata structure is above a threshold size, it is separated into layers that are then appended to the storage device from lowest to highest. An offset is retrieved for appended layers and provided to upper-level layers that refer to them until the full structure is stored. For storing smaller pieces of metadata that refer to each other, the system configures upper-level nodes with relative references that express the location of metadata relative to the node. This enables atomic write operations for smaller metadata structures and/or portions of larger structures.

18 Claims, 12 Drawing Sheets

(56) References Cited

U.S. PATENT DOCUMENTS

2021/0303528 A1    9/2021  Meister et al.
2021/0382826 A1*  12/2021  Wang .................. G06F 11/1076
2022/0027051 A1    1/2022  Kant et al.
2022/0382760 A1*  12/2022  Pang .................. G06F 16/2246

OTHER PUBLICATIONS

Bjørling, Matias, "New NVMe™ Specification Defines Zoned Namespaces (ZNS) as Go-To Industry Technology", Retrieved From: https://nvmexpress.org/new-nvmetm-specification-defines-zoned-namespaces-zns-as-go-to-industry-technology/, Jun. 18, 2019, 4 Pages.

Lee, et al., "Buffered I/O support for Zoned Namespace SSD", In Proceedings of Sixth International Conference on Consumer Electronics, Nov. 1, 2021, pp. 403-406.

Purandare, et al., "Append is Near: Log-based Data Management on ZNS SSDs", In Proceedings of 12th Annual Conference on Innovative Data Systems Research, Jan. 9, 2022, 10 Pages.

* cited by examiner

FILE SYSTEM METADATA LAYOUT FOR APPEND-ONLY STORAGE

BACKGROUND

As the scale and complexity of computing rapidly increases, demand for high-speed and high-capacity storage naturally increases as well. With the advent of solid-state devices (SSDs) modern storage systems often boast much higher speeds in comparison to traditional mechanical devices such as hard-disk drives (HDDs). However, while solid-state devices offer high speeds, mechanical devices can provide comparatively higher storage capacity. As such, despite advances in the capacity of solid-state devices, large-scale systems can struggle to achieve high storage density.

In a large-scale context, such as a datacenter, storage density can be a key consideration for operators as increasing storage density can reduce the space required to house the requisite hardware for a given volume of storage. For example, power and cooling oftentimes represent a significant portion of operating costs for a datacenter. Consequently, by increasing storage density, the operator can reduce the costs associated with maintaining, cooling, and otherwise operating large-scale storage systems.

To that end, many advances in storage device architecture have greatly improved storage capacity in SSDs such as quad-level cells (QLC). In addition, standardized methods for interfacing with SSDs such as the non-volatile memory express (NVMe) standard enable computing systems to utilize improvements in storage technology and thus improve density. One such innovation is append-only storage technology such as zoned namespace (ZNS), an extension of the NVMe standard that introduces many operational improvements by enabling an SSD to align digital data to the physical hardware storage media. In contrast to the blocks of storage exposed by typical SSDs, ZNS devices organize storage media into zones. As a result, ZNS enables an SSD to expose significantly increased storage capacity, reduces computational waste associated with write amplification, and reduces access latencies.

However, ZNS also imposes an operational paradigm at the software level (e.g., file systems) that can hamper efficiency if left unaddressed. For example, to enable various abstractions that support file system activity, typical SSDs utilize a flash translation layer (FTL) that acts as an intermediary between the file system the physical media of the SSD. However, the FTL itself requires computing resources and memory, the demands of which increase proportionally with the density of the SSD. This increasing demand leads to increased device latency. Moreover, the FTL represents a significant fraction of the cost for an SSD which similarly inflates as capacity grows. To address these issues, ZNS exposes an interface that lies closer to the physical media of the SSD thereby eliminating complexity and enabling the various benefits mentioned above.

SUMMARY

The techniques described herein provide systems for enhancing the functionality of file systems by the introduction of a file system metadata layout that is compatible with append-only storage devices. The organization of the metadata structure discussed herein is configured by a write buffer for application to file system metadata in a file system context. However, the techniques discussed herein can also be applied to other data that exhibits coupled behavior similar to the references of the file metadata structure. In addition, it should be understood that the write buffer can be a component and/or an extension of a file system for enabling file metadata storage on append-only storage devices.

The disclosed system addresses several technical problems associated with storing file system metadata structures in append-only storage devices such as zoned namespace (ZNS) devices. For instance, conventional file system metadata structures which utilize absolute references are incompatible with append-only storage devices due to their zoned architecture. In contrast, by organizing file system metadata to be appended layer by layer up the data structure, the disclosed system enables file system metadata to be stored on append-only storage devices.

In addition, by formatting the file system metadata structure with relative references rather than absolute references, the disclosed techniques enable atomic write operations for pieces of metadata. While appending metadata layer by layer as mentioned above is well suited for large volumes of metadata (e.g., a large data structure), atomic writing enables decreased latency when storing small pieces of metadata that refer to each other. This is because the latency for appending a metadata structure one layer at a time is proportional to the depth of the metadata structure. Stated another way, the more layers a structure comprises, the more time is required to store it as the write buffer must await completion of the previous layer before proceeding to the next. Such latency is a worthy tradeoff when each layer contains a large amount of metadata. In contrast, when storing only a small amount of metadata, the system can elect to atomize the write operation by reformatting data with relative references thereby bypassing the latency associated with waiting for lower-level write completions.

In still another technical benefit, utilizing relative references improves the efficiency of file systems. As mentioned above, typical file system metadata structures that use absolute references become unwieldy as they grow in size leading to slowdowns and hampering efficiency. Conversely, by utilizing relative references, the disclosed system enables file system metadata structures to scale without sacrificing performance. Consequently, the disclosed system does not impose a practical limit on the scale of file system metadata structures. As modern computing systems balloon in size and complexity scalability is key concern.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of FIG. 1 is a block diagram of an example system for organizing file system metadata for compatible storage at an append-only storage device.

DETAILED DESCRIPTION

Figure 1:
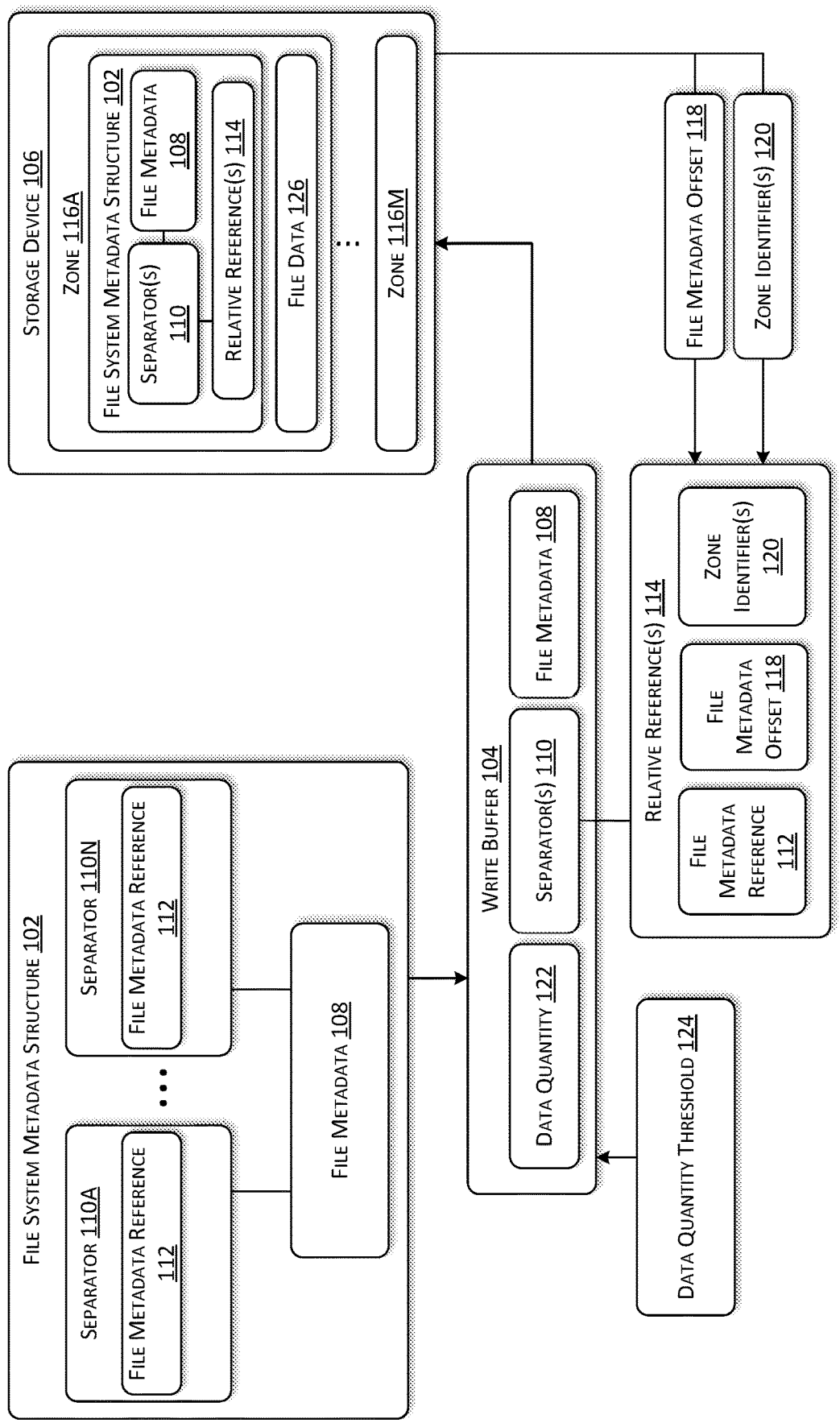

The techniques disclosed herein improve the functionality of file systems by introducing a file system metadata layout that is compatible with append-only storage devices. One example of an append-only storage device is a zoned namespace (ZNS) device mentioned above. To write data to an append-only storage device such as a ZNS device, data is appended to various zones of the storage device as opposed to being written to a specific allocated location as is typical in solid-state storage devices (SSDs). Consequently, append-only storage devices impose a different operational environment from typical SSDs thus requiring considerations for the organization of data and file system operations. For the sake of discussion, append-only storage devices may also be referred to herein as zoned storage devices.

One such consideration is the layout of file system metadata. File system metadata is data defining various characteristics of an associated file such as file size, a timestamp (e.g., a time when the file was created or last modified), a file type, and so forth. In various examples, the file metadata is organized as a tree structure with the figurative leaves of the tree containing the file metadata itself and branches containing separators that organize the file metadata into the various categories. Stated another way, each separator is associated with a certain category of file metadata (e.g., file name, file type). In one example, a file system metadata structure contains a separator defining a certain range of the file metadata as the name of an associated file. Another separator defines a different range of the file metadata as the size of the file and so forth. Consequently, the file metadata for a particular file contains a plurality of separators defining various aspects of the file. Each separator is configured with a reference to the file metadata to enable the functionality of the separators. The reference is a value that enables indirect access the file metadata by the separators and/or other programs that read or otherwise access the file system metadata structure such as a file explorer.

To store the file system metadata structure for a given file, a write buffer receives the file system metadata structure for storage at an append-only storage device. The write buffer is a software and/or hardware component for receiving and processing data for transmission to the append-only storage device. The file system metadata structure is broken down into the constituent file metadata and separators that refer to the file metadata. To ensure compatibility with various zones of the append-only storage device, the file metadata and the separators are arranged by the write buffer such that the file metadata is appended to the append-only storage device prior to any of the upper-level separators that contain references to the file metadata.

Accordingly, the write buffer appends the file metadata to a zone of the append-only storage device. In the context of the present disclosure, appending data to a zone may also be referred to as writing. As such, the action of appending data may also be referred to as a write operation. Zones are sections of the physical storage media within the append-only storage device that interface with external components such as a file system. In various examples, the size of a zone is uniform across an entire device (e.g., one hundred megabytes). Alternatively, zone size may vary from zone to zone within an append-only storage device. As mentioned above, organizing storage media into zones as opposed to the blocks of typical SSDs enables increased capacity and reduced computational waste.

After completing the write operation for the file metadata, the file metadata is post-processed by retrieving a zone identifier and an offset of the file metadata within the zone relative to a starting position of the zone. In contrast to typical SSDs where the location of data can be expressed using an address to identify a block containing the data, append-only storage devices express location using the zone identifier and the offset. Because zones are continuous pieces of storage media, writing data to a particular location within a zone requires a complete wipe of the zone and sequentially rewriting data to the zone. Consequently, simply appending data to a zone is a comparatively more efficient method of writing data, hence the increased use of append-only storage devices.

Following the appending and post-processing of the file metadata, the separators are configured with relative references to the file metadata using the zone identifier and the offset of the file metadata. As will be elaborated upon below, relative references enable the separators to find the associated file metadata without requiring knowledge of the exact location of the file metadata as is typical in conventional metadata structures. Rather, each relative reference expresses the location of associated file metadata within the zone relative to a starting position. In this way, when a program which utilizes the separators seeks the file metadata, the program simply traverses the zone to the location indicated by the file metadata offset.

The separators are then appended to the zone with the file metadata at the append-only storage device. In one example, the separators are appended to the same zone as the file metadata and as such, there is no need to extract a zone identifier for the separators. In an alternative example, the separators are appended to a different zone than the file metadata. Accordingly, a zone identifier is extracted for the separators. In this way, the metadata structure is progressively appended layer-by-layer to enable storage on the append-only storage devices such as ZNS.

The techniques discussed herein address several technical challenges associated with utilizing ZNS devices for storing file system metadata. For instance, typical file system metadata structures utilize absolute references for separators which require the precise location of associated file metadata (i.e., an address). For example, when accessing a file, application interact with an abstraction provided by a file system often referred to as virtual cluster numbers (VCNs). VCNs associate various locations within a file to the constituent data itself and are mapped to logical block addresses (LBAs) on the physical device. However, in an append-only storage device such as ZNS, write operations for a given VCN that target a given LBA must be changed to accommodate the zoned architecture of the storage device. Due to the zoned architecture, an LBA cannot be overwritten without first erasing it and all adjacent data within the zone. Consequently, the key challenge associated with storing file system metadata on an append-only storage device is that metadata addresses must be known to upper levels of the data structure such that correct addresses can be stored at the upper levels.

Furthermore, as discussed above, the location of data within a zone of an append-only storage device is expressed by an offset due to the unique architecture of append-only storage devices. Unfortunately, while such append-only storage devices realize many benefits their architecture also renders conventional file system metadata structures incompatible with append-only storage devices. As such, existing storage systems for that utilize append-only storage devices must store file system metadata on a separate device such as conventional SSD. However, by appending the file system metadata structure hierarchically, and formatting upper levels of the structure with locations of lower-level data, the disclosed system enables file system metadata compatibility with append-only storage devices.

In addition, by formatting the file system metadata structure with relative references rather than absolute references, the disclosed techniques enable atomic write operations for pieces of metadata. Such an approach does not incur latencies associated with appending metadata structures layer-by-layer as mentioned above. While such a tradeoff is worthwhile for large structures where data within a single layer can be appended in parallel, incurring such latencies is less desirable for small amounts of metadata. As such, by enabling atomic write operations, small metadata structures can be stored with minimal latency. In addition, atomic write operations can be applied to portions of a large metadata structure that are related.

In another technical feature of the present disclosure, file system metadata is organized relatively rather than absolutely. This enables the file system metadata structure to grow in scale without sacrificing performance. In typical file system metadata structures that utilize absolute references, the operations associated with seeking and accessing metadata become gradually more resource intensive as the tree structure grows in size. Consequently, typical file system metadata structures impose a practical limit on scale due to the slowdown associated with the size of the tree structure. In contrast, by laying out the tree relatively, the proposed techniques avoid this slowdown thereby improving overall efficiency of the file system.

Various examples, scenarios, and aspects that enable the storage of file system metadata on append-only storage devices are described below with respect to FIGS. 1-8.

FIG. 1 illustrates a system 100 in which a file system metadata structure 102 is processed by a write buffer 104 for storage in a storage device 106. The file system metadata structure 102 is a data structure that can be organized using any suitable method such as a B-tree data structure. As shown in FIG. 1, the file system metadata structure 102 is organized into a first layer containing the file metadata 108 itself and a second layer containing a plurality of separators 110A-110N. It should be understood that the separators 110A-110N (collectively "separator(s) 110") can be nodes and a node can be any entity within the file system metadata structure 102.

The separators 110 define meanings for portions of the file metadata 108. For example, a first separator 110A defines a first portion of the file metadata as a name of an associated file. Similarly, a second separator 110N (e.g., N=2) defines a second portion of the file metadata 108 as the file type. It should be understood that the file system metadata structure 102 may contain any number of separators 110. To facilitate the functionality discussed above, each separator 110 includes a file metadata reference 112 to enable access to the file metadata 108.

Figure 2A:
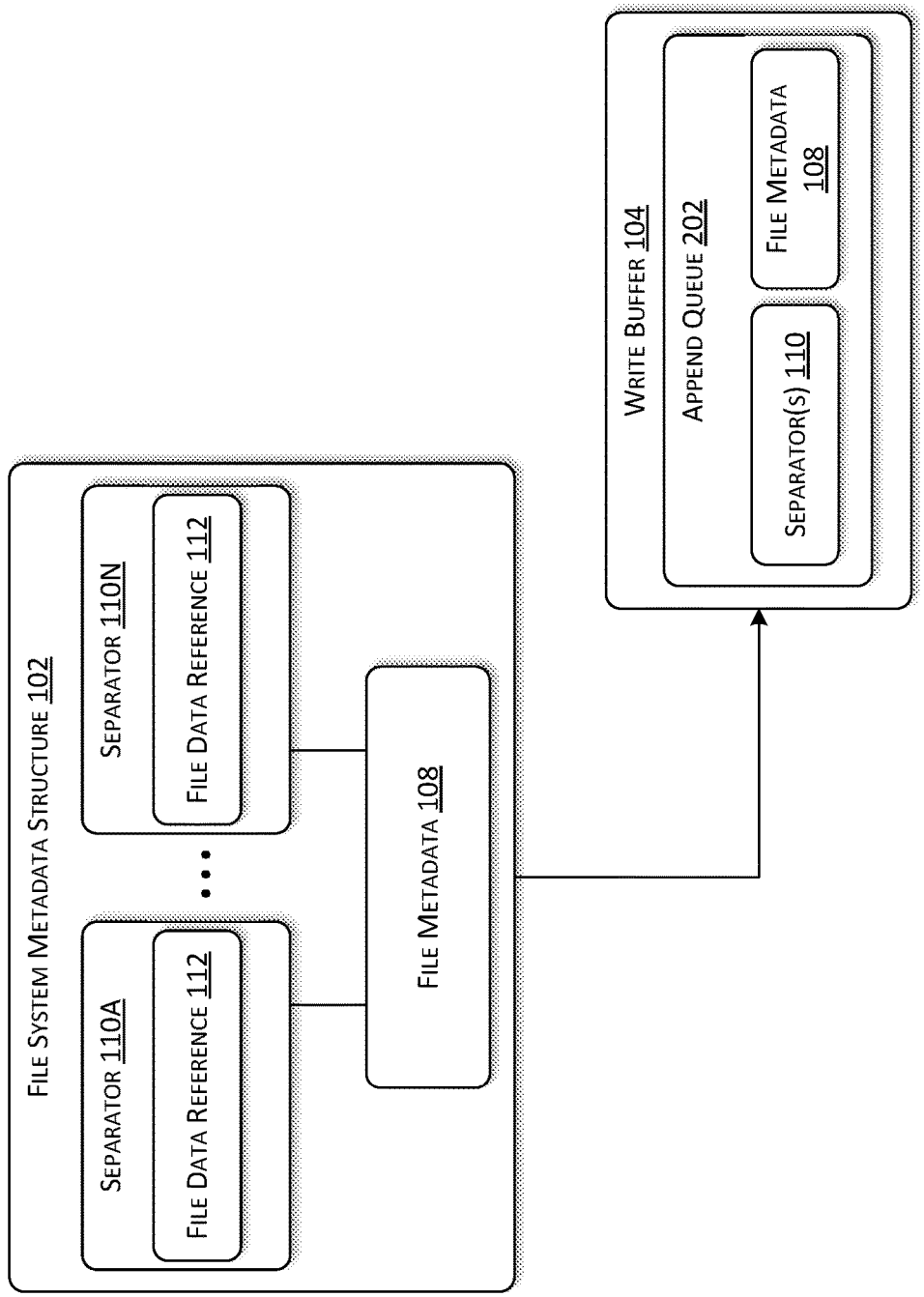
FIG. 2A illustrates an example system for organizing file system metadata for compatible storage at an append-only storage device in a first phase of operation.
Figure 2B:
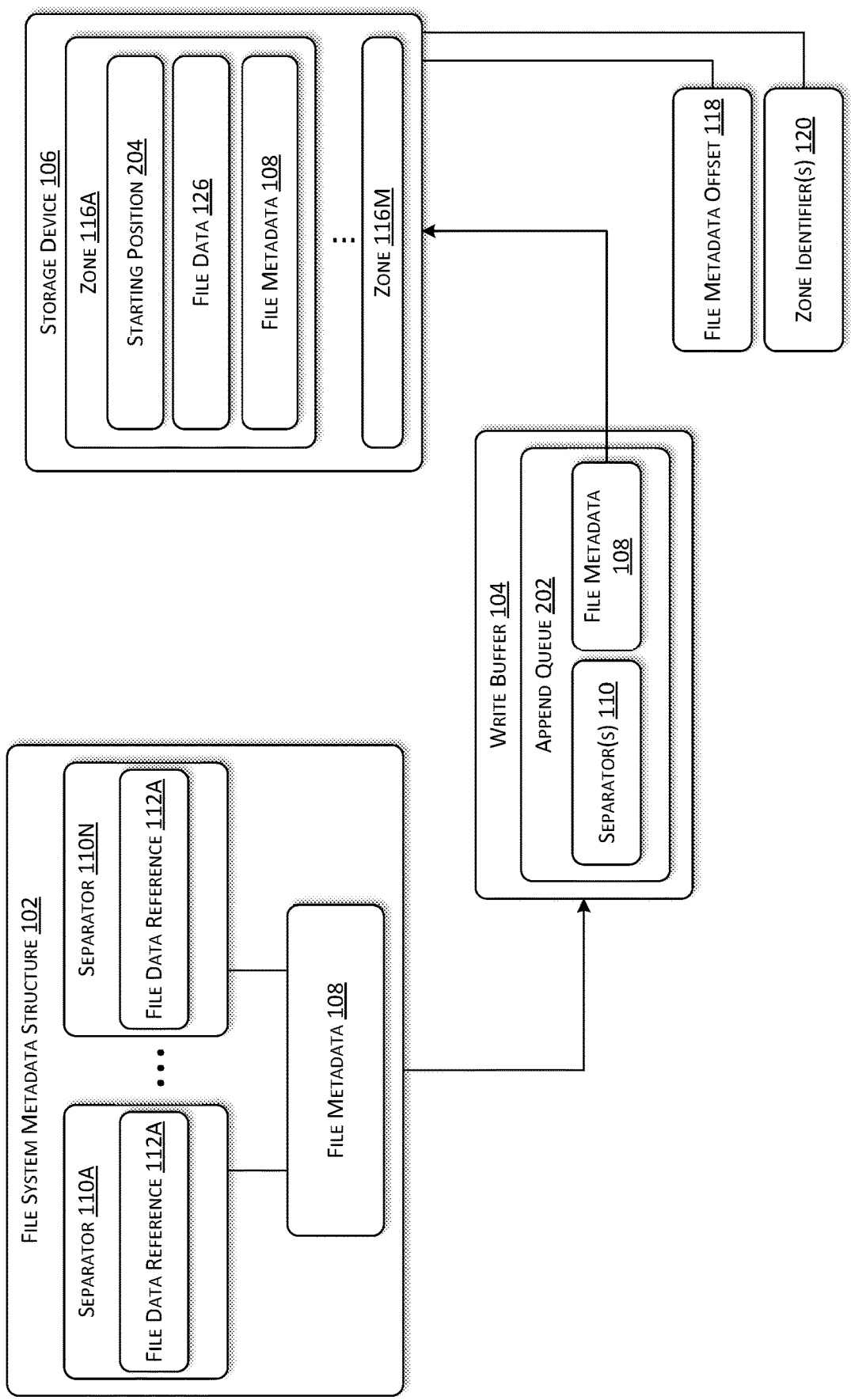
FIG. 2B illustrates an example system for organizing file system metadata for compatible storage at an append-only storage device in a second phase of operation.
Figure 2C:
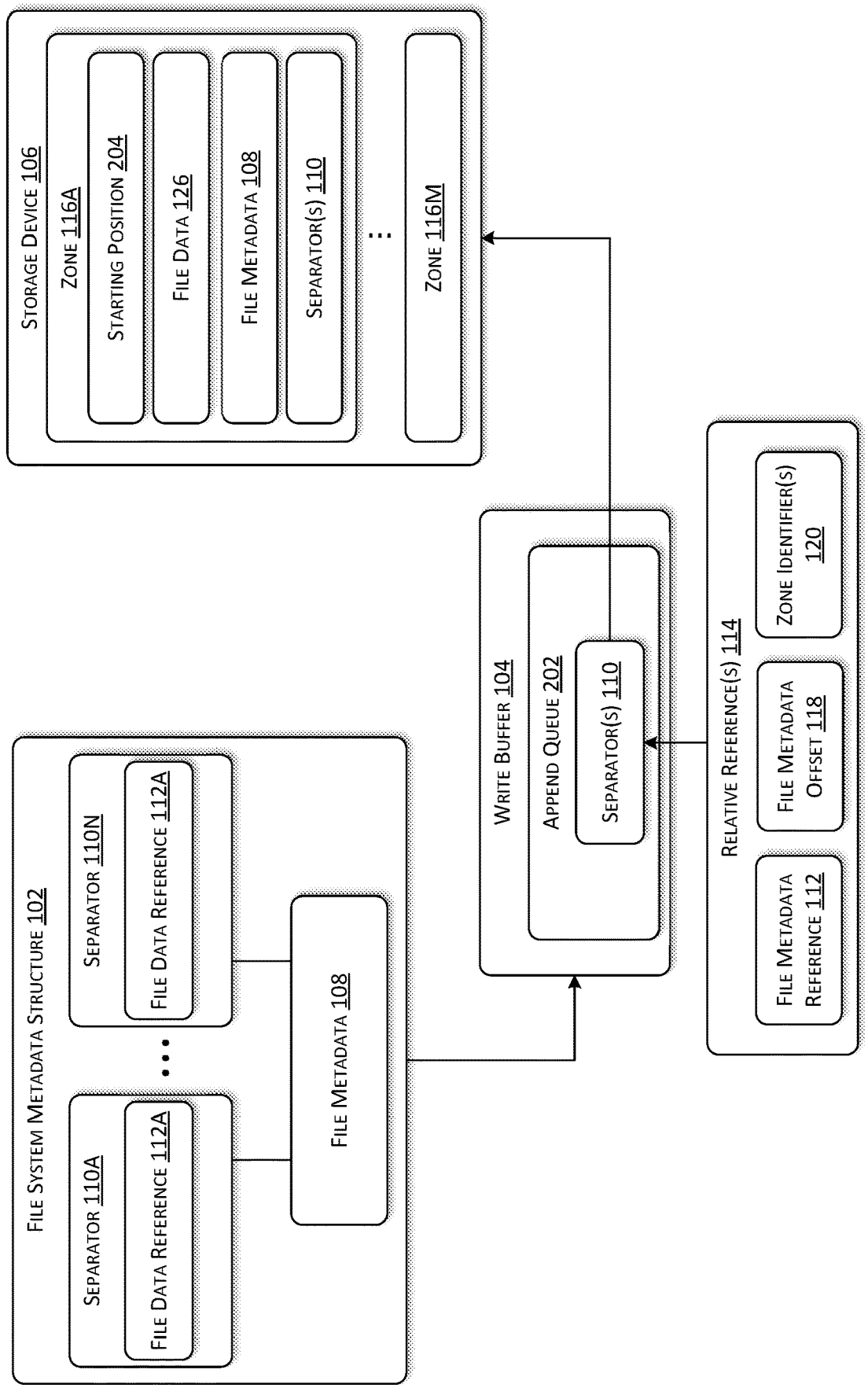
FIG. 2C illustrates an example system for organizing file system metadata for compatible storage at an append-only storage device in a third phase of operation.

To append the file system metadata structure 102 to the storage device 106, the write buffer 104 arranges the constituent file metadata 108 and separators 110 such that the file metadata 108 is appended prior to any of the separators 110 (as illustrated by the file metadata 108 being on the right side of the separators 110 in the write buffer of FIGS. 1-2C). The order in which the file metadata 108 and the associated separators 110 are appended to the storage device 106 enables generation of relative references 114. As will be elaborated upon below, the relative references 114 enable the separators 110 to access the file metadata 108 without knowledge of the exact location of the file metadata 108.

The write buffer 104 begins by appending the file metadata 108 to a zone 116A of the storage device 106. As shown in FIG. 1, the storage device 106 contains a plurality of zones 116A-116M. The zone 116A is selected using various criteria, such as the size of the file system metadata structure 102, the available space in the zone 116A, and so forth. After appending the file metadata 108 to the zone 116A, a file metadata offset 118 is extracted from the storage device 106. As will be discussed below, the file metadata offset 118 expresses a location of the file metadata 108 within the zone 116A relative to a starting position of the zone 116A. In addition, a zone identifier 120 is extracted identifying the zone 116A. The action of extracting the file metadata offset 118 and the zone identifier 120 after appending the file metadata 108 to the zone 116A can be referred to as postprocessing.

After completing postprocessing for the file metadata 108, the system 100 generates a relative reference 114 for each of the separators 110. In various examples, the relative reference 114 includes the file metadata offset 118, the zone identifier 120, as well as the file metadata reference 112 for the separator 110 included in the file system metadata structure 102. As will be elaborated upon below, including the file metadata offset 118 enables the relative reference 114 to express the location of the file metadata 108 relative to the separator 110. In this way, addresses for the file metadata 108 can be known to the separators 110, which, as illustrated in FIG. 1 are at a higher level in the file system metadata structure 102 compared to the level of the file metadata 108. In this way, the correct addresses can be stored at higher levels of the file system metadata structure 102.

Subsequently, the write buffer 104 formats the separators 110 with the relative references 114 that express the location of the file metadata 108 within the zone 116A. The write buffer 104 then appends the separators 110 to the zone 116A. As the separators 110 are appended to the same zone 116A as the file metadata 108 as shown in FIG. 1, it is unnecessary to extract the zone identifier 120 again. In an alternative example however, the write buffer 104 appends the separators 110 to a zone 116M that is different from the zone 116A containing the file metadata 108. In such a situation, a second zone identifier for the zone 116M is extracted.

As a consequence of the approach described above, the file system metadata structure 102 is now compatible with the zoned architecture of the storage device 106. In various examples, the file system metadata structure 102 is stored in the zone 116A alongside file data 126. Furthermore, while the file system metadata structure 102 illustrated in FIG. 1 comprises two levels (e.g. one level for the separators 110A-110N positioned above one level for the file metadata 108), the file system metadata structure 102 can comprise any number of levels. Moreover, the write buffer 104 progresses up the file system metadata structure 102 that is appended to the zone 116A layer-by-layer until the full file system metadata structure 102 is stored.

Furthermore, the write buffer 104 can be configured to analyze the file system metadata structure 102 to determine a data quantity 122 of the file system metadata structure 102. The data quantity 122 is then compared against a data quantity threshold 124. If the data quantity 122 meets or exceeds the data quantity threshold 124, the system 100 processes the file system metadata structure 102 according to the features discussed above and below with respect to FIG. 2A-2C. Alternatively, as will be discussed below with respect to FIG. 3, if the data quantity 122 is below the data quantity threshold 124, the system 100 processes the file system metadata structure 102 using an alternative approach. This is due to various tradeoffs associated with appending file system metadata structures 102 that vary in size that will be elaborated upon below.

Turning now to FIG. 2A, the file system metadata structure 102 is provided to the write buffer 104. As described above, the write buffer 104 arranges the file metadata 108 and the separators 110 such that the file metadata 108 is appended to the storage device 106 prior to any of the separators 110. To accomplish this, the write buffer 104 is configured with an append queue 202 in which the file metadata 108, separators 110, or other data is staged prior to appending to a zone 116 of the storage device 106. File metadata 108 and separators 110 in the append queue 202 are naturally dispatched to the storage device 106 in the order in which they are arranged.

Furthermore, the write buffer 104 can also be configured to receive a plurality of file system metadata structures 102 from a corresponding plurality of files. In one example, the write buffer 104 is configured to append all file metadata 108 from the plurality of file system metadata structures 102 to zones 116 of the storage device prior to any of the separators 110. In an alternative example, the write buffer 104 processes file system metadata structures 102 on a per file basis. As such, the file metadata 108 for a file followed by the separators 110 for the file. Once the whole file system metadata structure 102 is stored, the write buffer 104 proceeds to process the next file.

Proceeding to FIG. 2B, after arranging the file metadata 108 and the associated separators 110 within the append queue 202, the write buffer 104 proceeds to append the file metadata 108 to a zone 116A within the storage device 106. As discussed above, the file metadata 108 is appended to the zone 116A. In one example, the zone 116A contains other data such as the file data 126 shown in FIG. 1, accordingly the file metadata 108 is appended to the end of the file data 126 within the zone.

Following the write operation for the file metadata 108, the system 100 postprocesses the file metadata 108 by extracting a file metadata offset 118 and a zone identifier 120. As mentioned above, the file metadata offset 118 expresses a location of the file metadata 108 within the zone 116A relative to a starting position 204 of the zone 116A. In an illustrative example, the starting position 204 is represented by a location zero "0". In addition, the file data 126 occupies fifty "50" units of storage. Accordingly, when the file metadata 108 is appended to the zone 116A behind the file data 126, the file metadata offset 118 is assigned a value of fifty "50" to indicate that the file metadata 108 begins fifty units of storage after the starting position 204 of zero "0". In addition, the zone identifier 120 indicates the zone 116A containing the file metadata 108.

Turning to FIG. 2C, following the appending and postprocessing of the file metadata 108, the separators 110 are configured with relative references 114 that express the location of the file metadata 108 within the zone 116A using the file metadata offset 118. The separators 110 are subsequently appended to the zone 116A. As shown in FIG. 2C, the separators 110 are appended behind the file metadata 108. However, it should be understood that other data may be appended to the zone 116A following the file metadata 108 and prior to the separators 110. As such, the separators 110 are appended to the zone 116A after the other data. When the separators 110 are appended to the zone 116A, the append queue 202 is now empty and can receive another file system metadata structure 102 for processing. Alternatively, the write buffer 104 may be configured to constantly receive file system metadata structures 102. As such, a new file metadata 108 for another file system metadata structure 102 may be waiting in the append queue 202 after the separators 110. In addition, while the examples discussed above involve appending a file system metadata structure 102 hierarchically (e.g., bottom to top), it should be understood that accessing (e.g., reading) the file metadata structure 102 from the storage device 106 can involve a different process. For example, a file system can be configured to read a file system metadata structure starting from the top at the separators 110 and proceeding downwards towards the file metadata 108.

Figure 3:
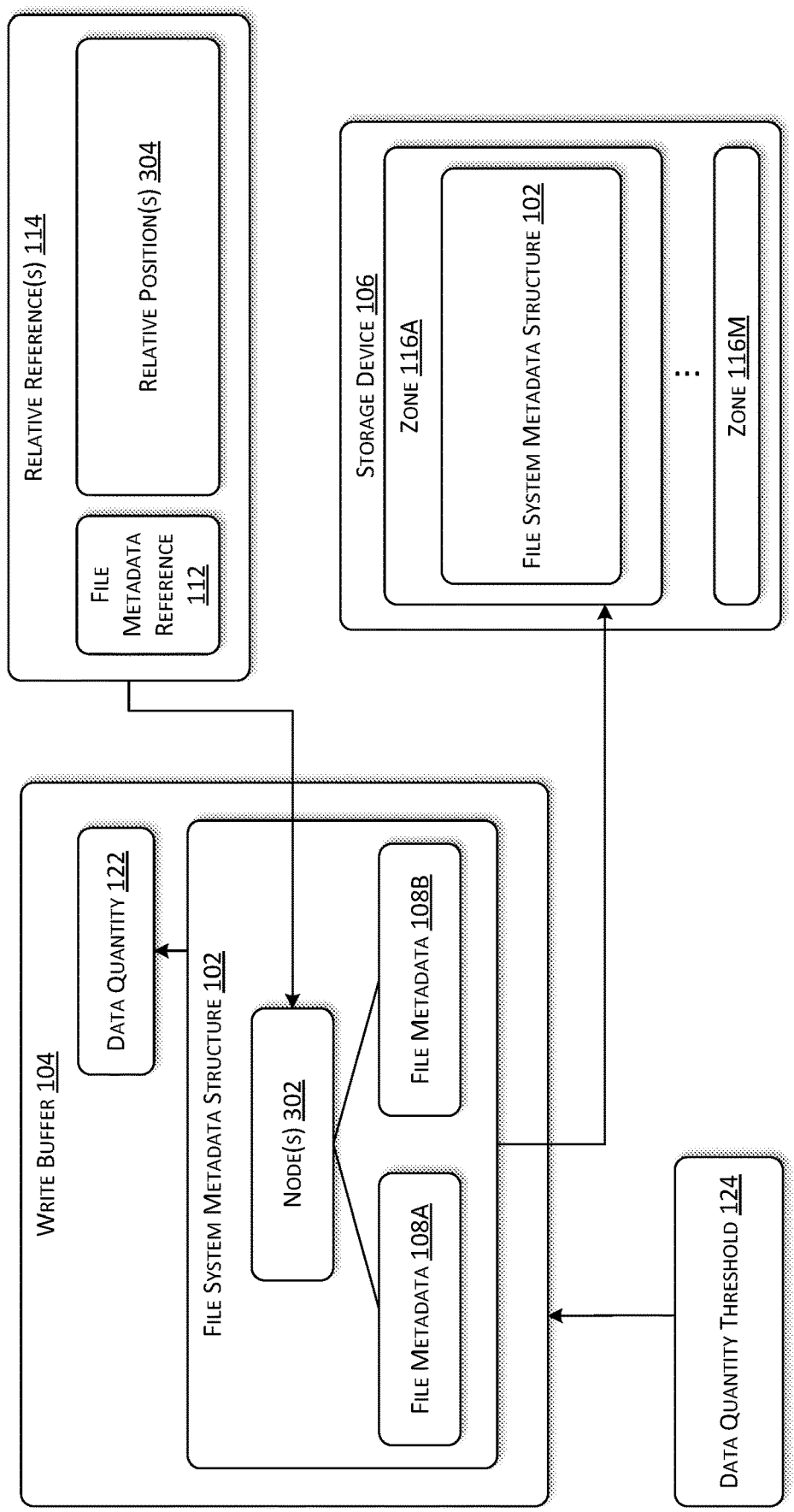
FIG. 3 illustrates an example system for organizing file system metadata for compatible storage at an append-only storage device using relative references to atomize write operations.

Proceeding to FIG. 3, an alternative example in which a root node 302 is configured with a relative reference 114 to enable atomic write operations for file system metadata structures 102 is shown and described. As shown in FIG. 3, the root node 302 refers to multiple instances of file metadata 108A and 108B. It should be understood that the root node 302 can refer to any number of instances of file metadata 108. Prior to appending the file system metadata structure 102 to the storage device 106, the root node 302 is configured with a relative reference 114. In various examples, the relative reference 114 includes a relative position 304 that expresses a position of the file metadata 108 relative to a position of the root node 302. In an illustrative example, the relative position 304 for the file metadata 108A defines a logical block address (LBA) for the file metadata 108A as the LBA for the root node 302 minus two positions. Meaning that the file metadata 108A is two positions away from the root node 302. Similarly, a relative position 304 is defined for the other instance of file metadata 108B as well as any other instances of the file metadata 108. Once the root node 302 is configured with the relative references 114 containing the relative positions 304, the file system metadata structure 102 is appended to the zone 116A as an atomic write operation. In addition, it should be understood that the node 302 can be any entity within the file system metadata structure 102. For instance, the file metadata 108 and the separators 110 are example of nodes 302.

As mentioned above, such an approach enables the system 100 to store a file system metadata structure 102 without incurring the latencies associated with waiting for lower-level write operation completions. This approach is preferrable for storing file system metadata structures 102 that contain a small amount of data. Conversely, the layer-by-layer approach shown and described above with respect to FIGS. 1-2C must await write operations for lower levels of the file system metadata structure 102 (e.g., file metadata 108) to complete before appending upper layers (e.g., separators 110). However, this is a worthwhile tradeoff for file system metadata structures 102 that contain a large of amount of data as write operations can be issued in parallel for a plurality of entities within a single layer such as the separators 110 thereby maintaining efficiency.

Accordingly, the system 100 can be configured to select between the layer-by-layer approach as described with respect to FIGS. 1-2C or the atomic write approach when processing file system metadata structures 102 as described with respect to FIG. 3. In one example, the write buffer 104 analyzes the file system metadata structure 102 to determine a data quantity 122 within the file system metadata structure 102. If the quantity of data meets or exceeds a data quantity threshold 124, the write buffer 104 processes the file system metadata structure 102 using the layer-by-layer approach described above with respect to FIGS. 1-2C. Conversely, if the quantity of data falls below the data quantity threshold 124, the write buffer 104 processes the file system metadata structure using the atomic write operations shown in FIG. 3.

Furthermore, the atomic write approach can be utilized to append portions of a file metadata structure 102. In one example, the file metadata structure 102 is a B-tree data structure comprising a first plurality of leaves containing the file metadata 108 while a second plurality of upper-level branches containing nodes 302 that refer the file metadata 108 in the leaves. Consequently, not all of the nodes 302 at the branches refer to the same leaves. Stated another way, the file metadata structure 102 can be separated into smaller constituent pieces that contain related data. Accordingly, the system 100 can optionally append portions of the file system metadata structure 102 that are related using the atomic write approach enabled by relative references 114 shown in FIG. 3 rather than the layer-by-layer approach shown in FIGS. 1-2C. In another example, the write buffer 104 begins storing a large file metadata structure 102 having a data quantity 122 that meets or exceeds the data quantity threshold 124 using the layer-by-layer approach. However, as the write buffer 104 reaches the upper layers of the file system metadata structure 102, the data quantity 122 may fall below the data quantity threshold 124. In response, the write buffer 104 switches to utilizing the atomic write approach for the remaining portions of the file system metadata structure 102.

Figure 4A:
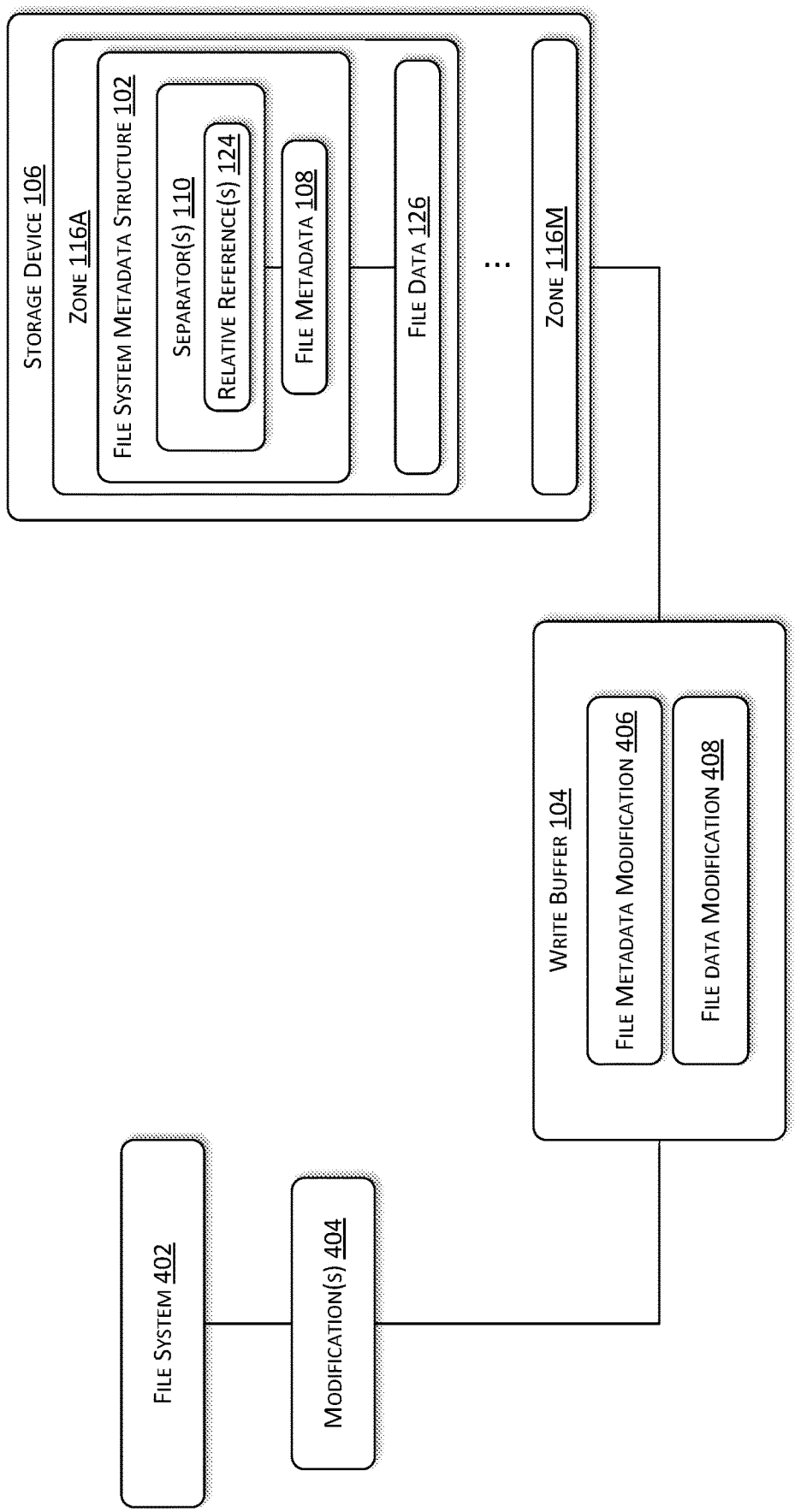
FIG. 4A illustrates an example system for organizing file system metadata for compatible storage at an append-only storage device in a first phase of operation.

Turning now to FIG. 4A, an example scenario in which a file system 402 applies a modification 404 to the file metadata 108 is shown and described. As discussed above, file system metadata structures 102 are appended to a storage device 106 using the layer-by-layer approach shown in FIGS. 1-2C, or alternatively, the atomic write approach shown in FIG. 3 based on the size of the file system metadata structure. At a later point, various circumstances may necessitate a modification 404 to the file system metadata structure 102. For example, a user can change a file name using the file system 402. Accordingly, the modified file name must be recorded in file metadata 108 via a modification 404. In another example, the user works on a text document resulting in an increased file size. Consequently, a corresponding modification 404 is applied to the file metadata 108 to record the new file size.

As with the file system metadata structure 102, the modification 404 is provided to the write buffer 104 for appending to the storage device 106. In various examples, the modification 404 contains a file metadata modification 406 and/or a file data modification 408. A file metadata modification 406 is any change to the file metadata 108. In one example, a file metadata modification 406 is moving a file from a first location to a second location. Accordingly, the new file location is captured by a file metadata modification 406. In this example, since the file data 126 is not modified, the modification 404 contains only a file metadata modification 406. A file data modification 408 is any change to file data 126. Naturally, since the file metadata 108 records characteristics of associated file data 126, any file data modification 408 necessitates a file metadata modification 406. For example, adding text to a document is a file data modification 408 while recording the change in file size from adding the text is a file metadata modification 406.

Figure 4B:
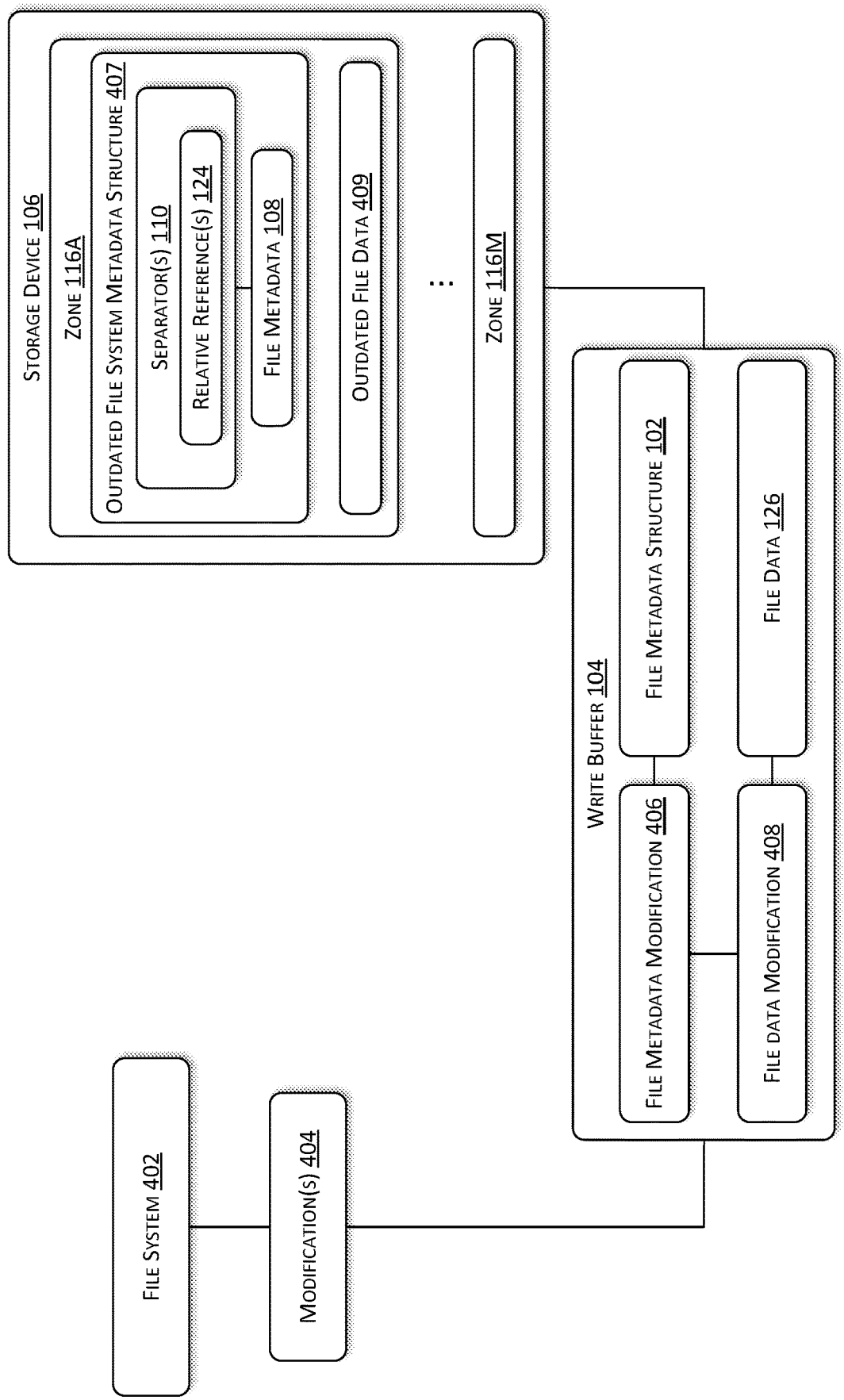
FIG. 4B illustrates an example system for organizing file system metadata for compatible storage at an append-only storage device in a second phase of operation.

Proceeding to FIG. 4B, the file metadata modification 406 and the file data modification 408 are applied to the associated file metadata 108 and file data 126, respectively. Generally described, modifying data involves applying the modification 404 (e.g., the file metadata modification 406) to the relevant data (e.g., the file metadata structure) and appending the modified data to the storage device 106. Consequently, the file metadata structure 102 and the file data 126 are now an outdated file system metadata structure 407 and an outdated file data 409 respectively. In various examples, the file system 402 is responsible for updating pointers to modified data during the appending process and preparing outdated data such as the outdated file system metadata structure 407 for removal via garbage collection processes.

As shown in FIG. 4B, the file metadata structure 102 and the file data 126 are extracted from the zone 116A. The write buffer 104 applies the modifications 404 and prepares to rewrite the file metadata structure 102 and the file data 126 to the zone 116. In various examples, the write buffer 104 applies the file metadata modification 406 to the file metadata 108. The changes introduced by the file metadata modification 406 are then propagated up the file metadata structure 102 to the separators 110 and/or any entity that refers to the file metadata 108 such as the node 302 discussed above. For instance, the relative references 114 for the separators 110 are updated to reflect the change to the file metadata 108. Accordingly, data defining the modifications 404 to the file metadata 108 are propagated to upper layers of the file system metadata structure 102 in response to a file metadata modification 406.

Figure 4C:
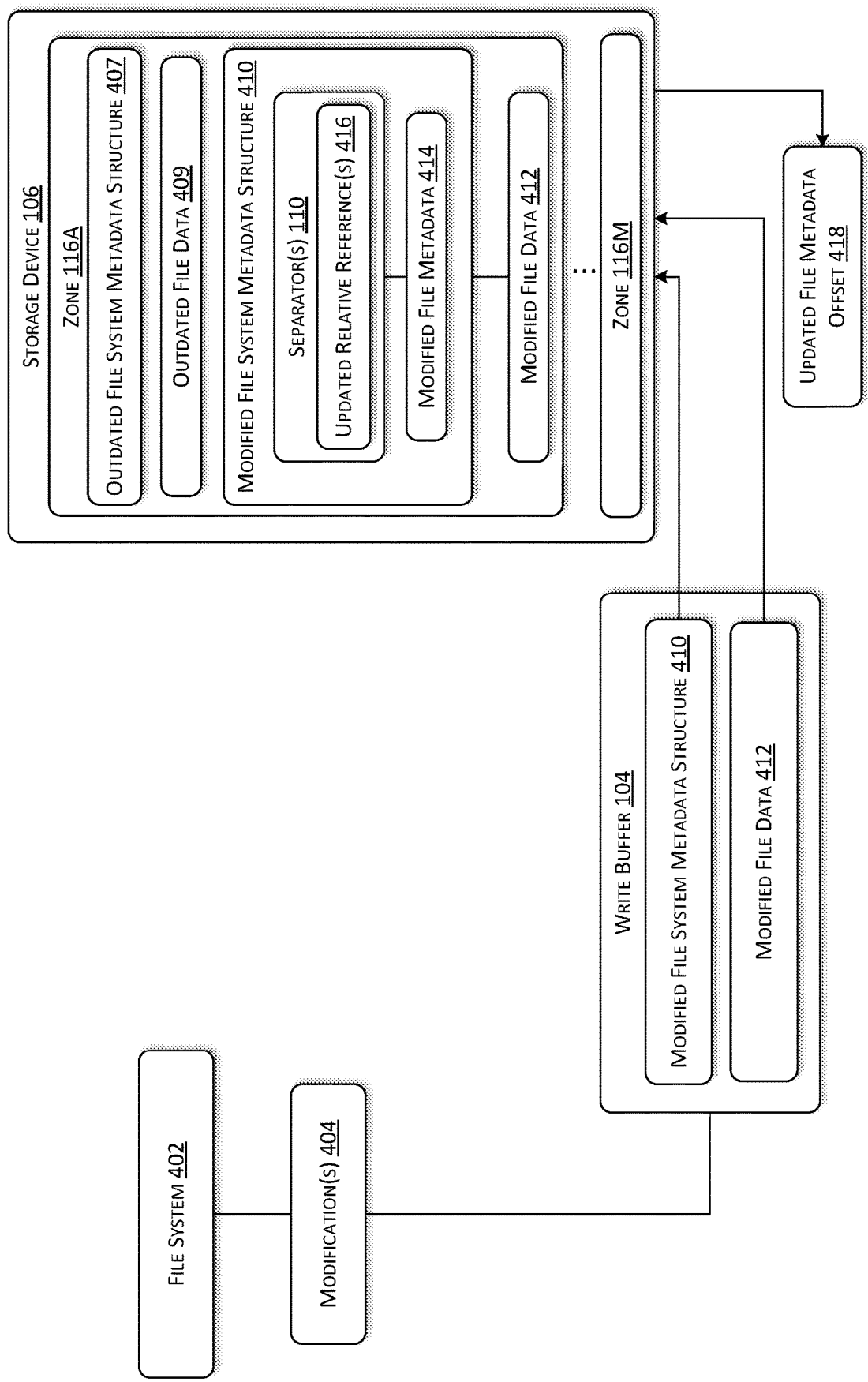
FIG. 4C illustrates an example system for organizing file system metadata for compatible storage at an append-only storage device in a third phase of operation.

Turning now to FIG. 4C, the write buffer 104 proceeds to append the modified file system metadata structure 410 and the modified file data 412 to the zone 116A. As shown, the modified file system metadata structure 410 includes modified file metadata 414 and separators 110 that have been reformatted with updated relative references 416. In addition, the modified file system metadata structure 410 and the modified file data 412 are appended to the zone 116A behind the outdated file system metadata structure 407 and the outdated file data 409. In various examples, this is because garbage collection processes for removing outdated data may not immediately execute in response to receiving the modifications 404. As such, the location of the modified file system metadata structure 410 is now different from what it was prior to the modifications 404. Accordingly, an updated file metadata offset 418 is extracted from the zone 116A to capture the new location.

This process of applying and propagating modifications 404 up a file system metadata structure 102 can be applied regardless of the method used to initially store the file system metadata structure 102. For instance, the layer-by-layer approach shown and discussed in FIGS. 1-2C or the atomic write approach shown and discussed in FIG. 3. Moreover, the modified file system metadata structure 410 and/or the modified file data 412 may be appended to a zone 116M that is different from the outdated file system metadata structure 407 and/or the outdated file data 409.

Figure 5:
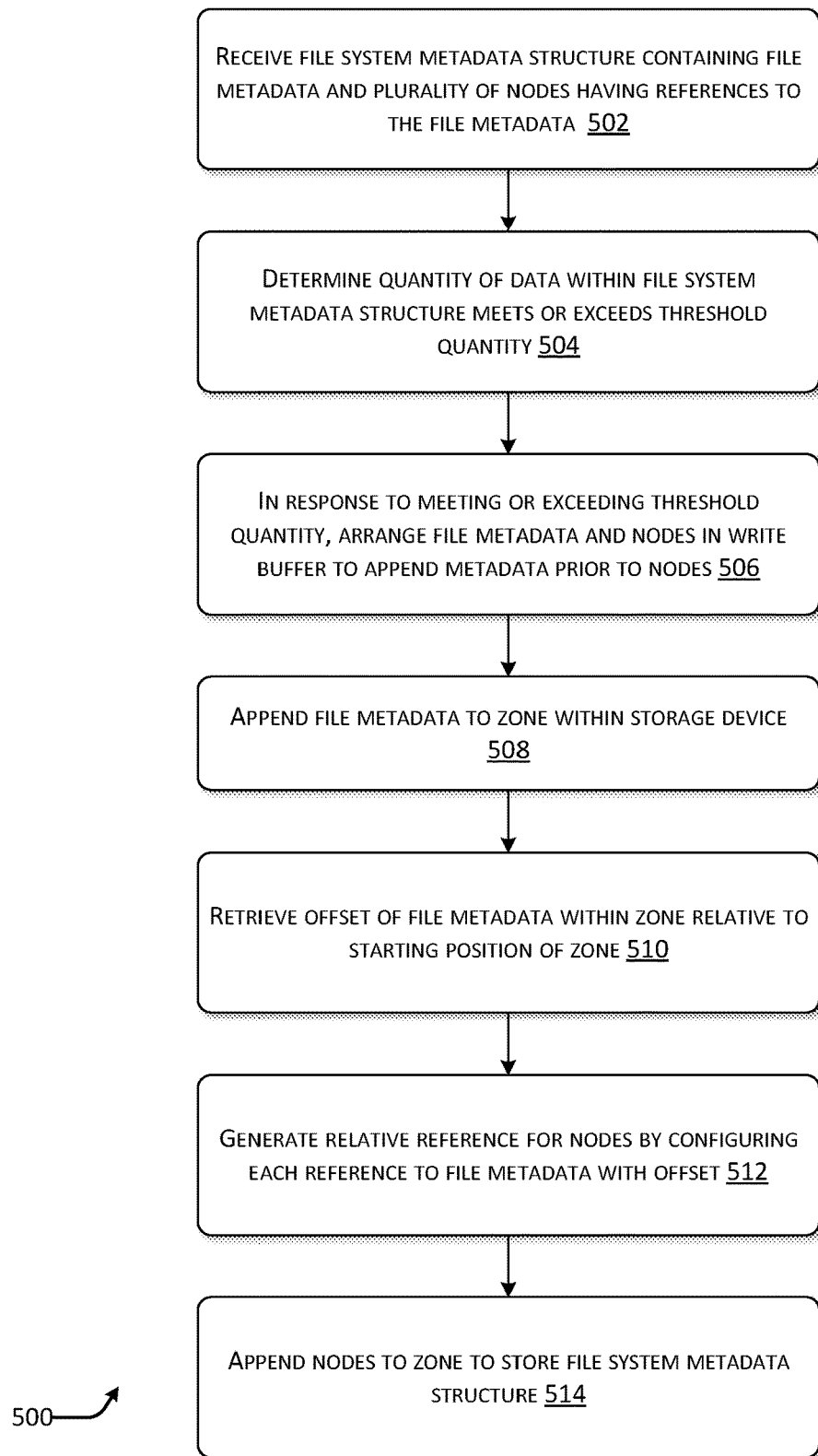
FIG. 5 is an example flow diagram showing aspects of a routine for organizing file system metadata for compatible storage at an append-only storage device.

Turning now to FIG. 5, aspects of a routine 500 for enabling storage of file system metadata on append-only devices are shown and described. In various examples, the routine 500 relates to the layer-by-layer approach shown and described above with respect to FIGS. 1 through 2C. With reference to FIG. 5, the routine 500 begins at operation 502 where a system receives a file system metadata structure containing file metadata and a plurality of nodes each having a reference to the file metadata.

Next, at operation 504, the system determines a quantity of data within the file system metadata meets or exceeds a threshold quantity of data.

Subsequently, at operation 506, in response to determining the quantity of data within the file system metadata meets or exceeds the threshold quantity of data, the system arranges the file metadata and the nodes within a write buffer such that the file metadata is appended to the storage device prior to any of the nodes.

Next, at operation 508, the write buffer appends the file metadata to a zone of the storage device.

Then, at operation 510, the system retrieves an offset of the file metadata within the zone relative to a starting position of the zone.

Proceeding to operation 512, the system generates relative references for the nodes using the offset of the file metadata within the zone.

Finally, at operation 514, the nodes, having been updated with the file metadata offset, are appended to the zone.

Figure 6:
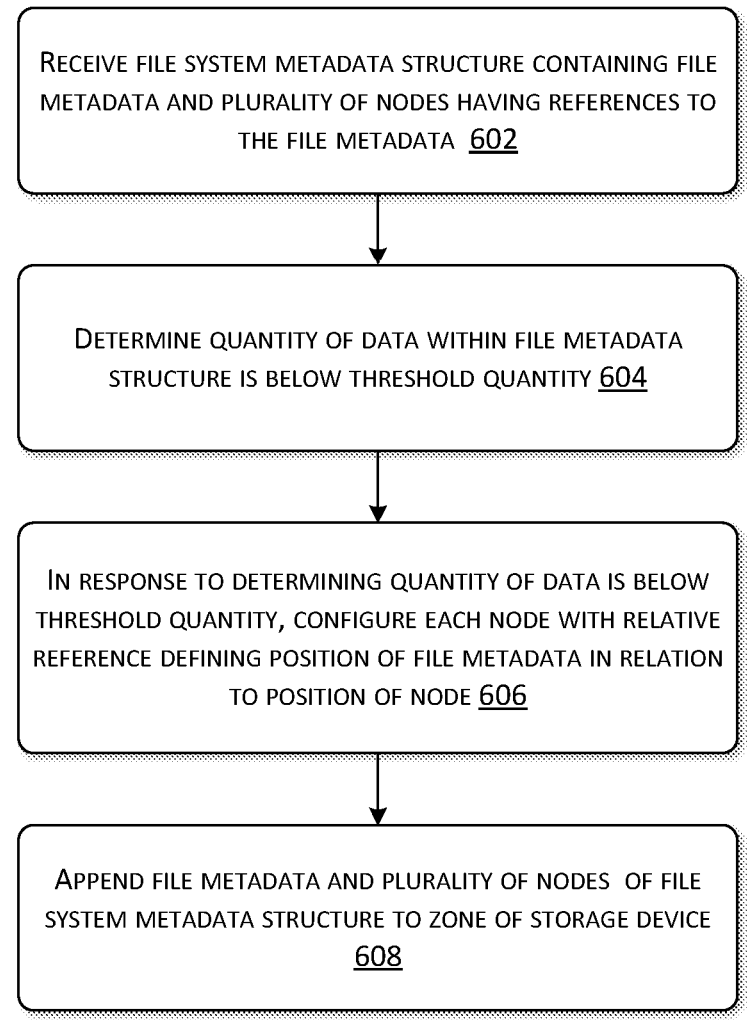
FIG. 6 is an example flow diagram showing aspects of a routine for organizing file system metadata for compatible storage at an append-only storage device.

Turning now to FIG. 6, aspects of a routine 600 for enabling storage of file system metadata on append-only devices are shown and described. In various examples, the routine 600 relates to the atomic write approach shown and described above with respect to FIG. 3. With reference to FIG. 6, the routine 600 begins at operation 602 where a system receives a file system metadata structure containing file metadata and a plurality of nodes each having reference to the file metadata.

Next, at operation 604, the system determines that a quantity of data within the file metadata structure is below a threshold quantity of data.

Then, at operation 606, in response to determining that the quantity of data within the file metadata structure is below the threshold quantity of data, the system configures each node with a relative reference that defines a position of the file metadata in relation to a position of the node.

Finally, at operation 608, the file metadata structure is appended to a zone of the storage device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. More or fewer operations can be performed than shown in the figures and described herein. These operations can also be performed in a different order than those described herein.

The illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 and/or the routine 600 can be implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 and/or the routine 600 may be also implemented in other ways. In one example, the routine 500 and/or the routine 600 is implemented, at least in part, by a processor of another remote computer or a local circuit. In addition, one or more of the operations of the routine 500 and/or the routine 600 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 7:
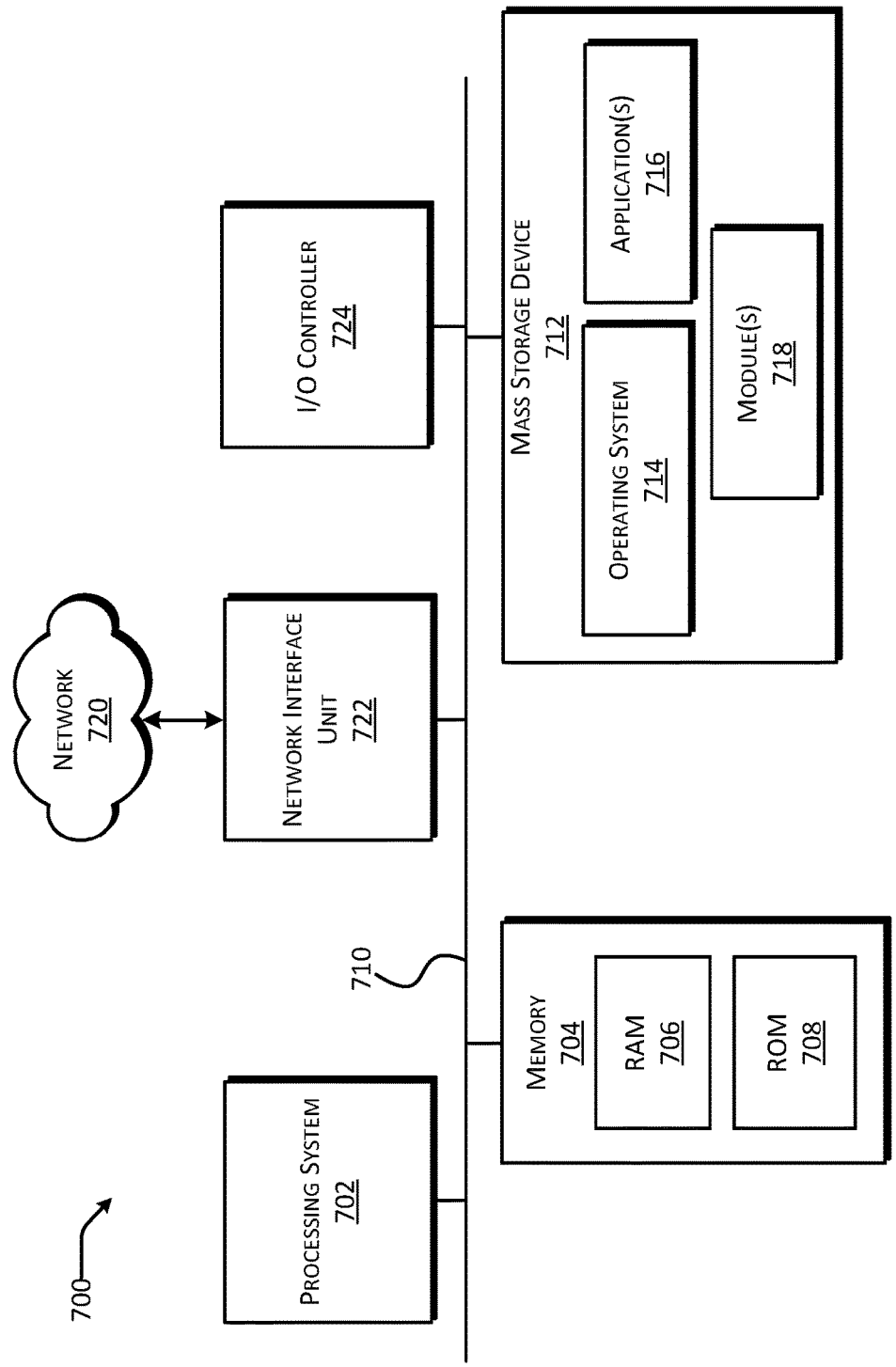
FIG. 7 is a computer architecture diagram illustrating an example computer hardware and software architecture for a computing system capable of implementing aspects of the techniques and technologies presented herein.

FIG. 7 shows additional details of an example computer architecture 700 for a device, such as a computer or a server configured as part of the cloud-based platform or system 100, capable of executing computer instructions (e.g., a module or a program component described herein). The computer architecture 700 illustrated in FIG. 7 includes processing system 702, a system memory 704, including a random-access memory 706 (RAM) and a read-only memory (ROM) 708, and a system bus 710 that couples the memory 704 to the processing system 702. The processing system 702 comprises processing unit(s). In various examples, the processing unit(s) of the processing system 702 are distributed. Stated another way, one processing unit of the processing system 702 may be located in a first location (e.g., a rack within a datacenter) while another processing unit of the processing system 702 is located in a second location separate from the first location.

Processing unit(s), such as processing unit(s) of processing system 702, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing system 702 through a mass storage controller connected to the bus 710. The mass storage device 712 and its associated computer-readable media provide non-volatile storage for the computer architecture 700. Although the description of computer-readable media contained herein refers to a mass storage device, the computer-readable media can be any available computer-readable storage media or communication media that can be accessed by the computer architecture 700.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

The software components described herein may, when loaded into the processing system 702 and executed, transform the processing system 702 and the overall computer architecture 700 from a general-purpose computing system into a special-purpose computing system customized to facilitate the functionality presented herein. The processing system 702 may be constructed from any number of transistors or other discrete circuit elements, which may individually or collectively assume any number of states. More specifically, the processing system 702 may operate as a finite-state machine, in response to executable instructions contained within the software modules disclosed herein. These computer-executable instructions may transform the processing system 702 by specifying how the processing system 702 transition between states, thereby transforming the transistors or other discrete hardware elements constituting the processing system 702.

Figure 8:
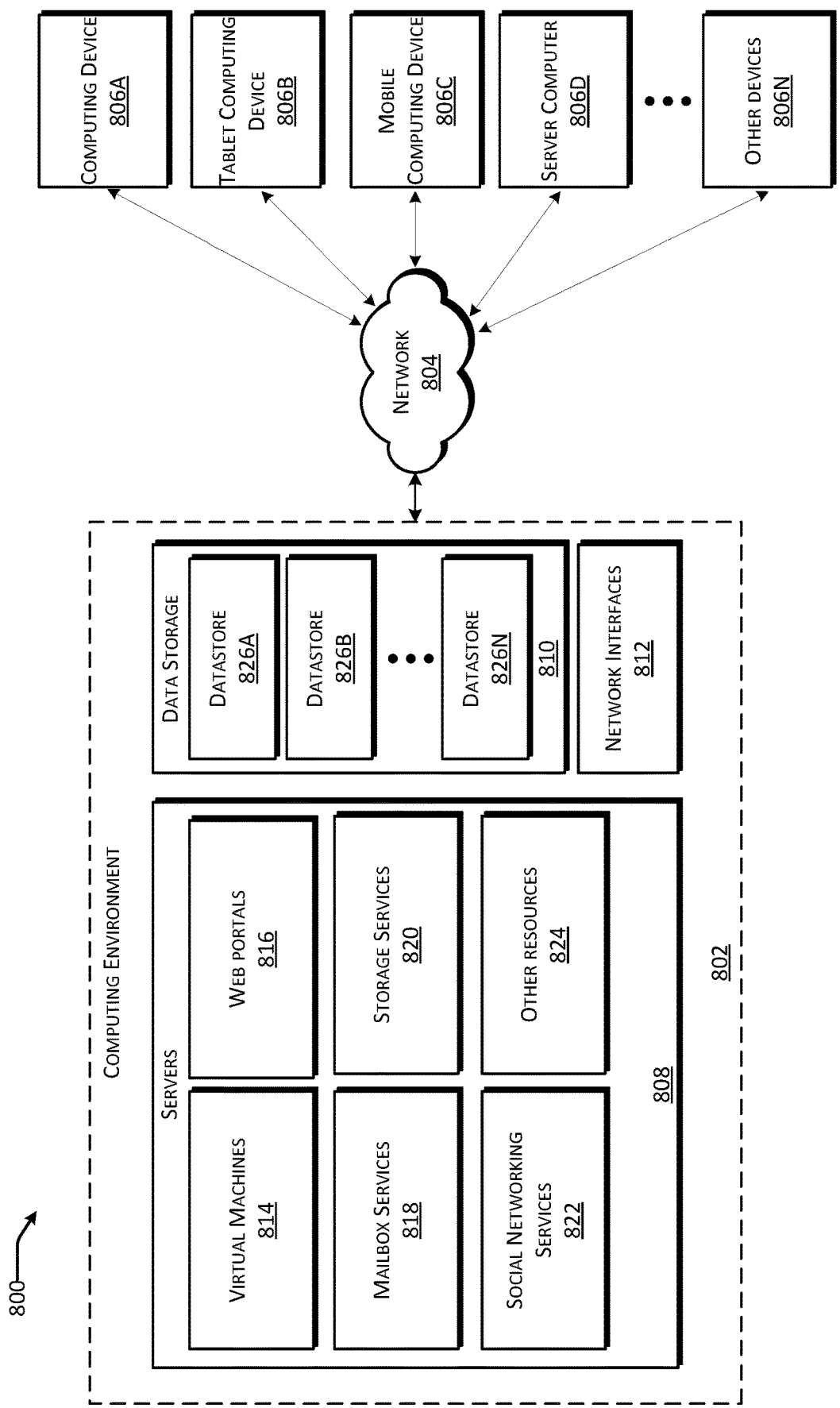
FIG. 8 is a diagram illustrating an example distributed computing environment capable of implementing aspects of the techniques and technologies presented herein.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein.

Accordingly, the distributed computing environment 800 can include a computing environment 802 operating on, in communication with, or as part of the network 804. The network 804 can include various access networks. One or more client devices 806A-806N (hereinafter referred to collectively and/or generically as "computing devices 806")

can communicate with the computing environment 802 via the network 804. In one illustrated configuration, the computing devices 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of computing devices 806 can communicate with the computing environment 802.

In various examples, the computing environment 802 includes servers 808, data storage 810, and one or more network interfaces 812. The servers 808 can host various services, virtual machines, portals, and/or other resources. In the illustrated configuration, the servers 808 host virtual machines 814, Web portals 816, mailbox services 818, storage services 820, and/or social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 800. The data storage 810 can include, host, or provide one or more real or virtual datastores 826A-826N (hereinafter referred to collectively and/or generically as "datastores 826"). The datastores 826 are configured to host data used or created by the servers 808 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including the computing devices and the servers. The network interfaces 812 also may be utilized to connect to other types of networks and/or computer systems.

The distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. The computing devices can include real or virtual machines including server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The disclosure presented herein also encompasses the subject matter set forth in the following clauses.

Example Clause A, a method comprising: receiving, by a processing system, a file system metadata structure for writing to a storage device, the file system metadata structure containing file metadata and a plurality of nodes that organizes the file metadata; determining that a quantity of data within the file system metadata structure meets or exceeds a threshold quantity of data; and in response to determining that the quantity of data within the file system metadata structure meets or exceeds the threshold quantity of data: arranging the file metadata and the plurality of nodes within a write buffer such that the file metadata is appended to the storage device prior to the plurality of nodes; appending the file metadata to a zone within the storage device using the write buffer; retrieving an offset of the file metadata within the zone relative to a starting position of the zone; generating a relative reference for each node of the plurality of nodes by configuring each node of the plurality of nodes in the write buffer with the offset of the file metadata; and appending each node of the plurality of nodes to the zone of the storage device using the write buffer.

Example Clause B, the method of Example Clause A, wherein the storage device is an append-only storage device.

Example Clause C, the method of Example Clause A or Example Clause B, wherein the file system metadata structure comprises a plurality of leaves containing the file metadata and a corresponding plurality of connected branches containing the plurality of nodes.

Example Clause D, the method of any one of Example Clause A though C, further comprising: modifying the file metadata within the zone of the storage device in response to a change to associated file data; and in response to modifying the file metadata, updating the relative reference for each node of the plurality of nodes with data defining the modification.

Example Clause E, the method of any one of Example Clause A though D, wherein the file system metadata structure is stored with file data within the storage device.

Example Clause F, the method of any one of Example Clause A though E, wherein the relative reference for each node of the plurality of nodes defines a range of the file metadata associated with a category of file metadata.

Example Clause G, a system comprising: a processing system; and a computer-readable medium having encoded thereon computer-readable instructions that when executed by the processing system cause the system to: receive a file system metadata structure for writing to a storage device, the file system metadata structure containing file metadata and a plurality of nodes that organize the file metadata; determine that a quantity of data within the file system metadata structure is below a threshold quantity of data; and in response to determining that the quantity of data within the file system metadata structure is below the threshold quantity of data: configure each node of the plurality of nodes with a relative reference defining a position of the file metadata in relation to a position of a respective node; and append, using the relative reference configured for each of the plurality of nodes, the file metadata and the plurality of nodes of the file system metadata structure to a zone of the storage device.

Example Clause H, the system of Example Clause G, wherein the storage device is an append-only storage device.

Example Clause I, the system of Example Clause G or Example Clause H, wherein the file system metadata structure comprises a plurality of leaves containing the file metadata and a corresponding plurality of connected branches containing the plurality of nodes.

Example Clause J, the system of any one of Example Clause G though I, wherein the computer-readable instructions further cause the system to: modify the file metadata within the zone of the storage device in response to a change to associated file data; and in response to modifying the file metadata, update the relative references for each of the plurality of nodes with data defining the modification.

Example Clause K, the system of any one of Example Clause G though J, wherein the file system metadata structure is stored with file data within the storage device.

Example Clause L, the system of any one of Example Clause G though K, wherein the relative references of the plurality of nodes defines a range of the file metadata associated with a category of file metadata.

Example Clause M, the system of any one of Example Clause G though L, wherein appending the file metadata and the plurality of nodes of the file system metadata structure to the zone comprises a single write operation.

Example Clause N, a system comprising: a processing system; and a computer-readable medium having encoded thereon computer-readable instructions that when executed by the processing system cause the system to: receive a file system metadata structure for writing to a storage device, the file system metadata structure containing file metadata and a plurality of nodes that organizes the file metadata; determine that a quantity of data within the file system metadata structure meets or exceeds a threshold quantity of data; and in response to determining that the quantity of data within the file system metadata structure meets or exceeds the threshold quantity of data: arrange the file metadata and the plurality of nodes within a write buffer such that the file metadata is appended to the storage device prior to the plurality of nodes; append the file metadata to a zone within the storage device using the write buffer; retrieve an offset of the file metadata within the zone relative to a starting position of the zone; generate a relative reference for each node of the plurality of nodes by configuring each node of the plurality of nodes in the write buffer with the offset of the file metadata; and append each node of the plurality of nodes to the storage device using the write buffer.

Example Clause O, the system of Example Clause N, wherein the file system metadata structure comprises a plurality of leaves containing the file metadata and a corresponding plurality of connected branches containing the plurality of nodes.

Example Clause P, the system of Example Clause N or Example Clause O, wherein the computer-readable instructions further cause the system to: modify the file metadata within the zone of the storage device in response to a change to associated file data; and in response to modifying the file metadata, update the relative reference for each of the plurality of nodes with data defining the modification.

Example Clause Q, the system of any one of Example Clause N through P, wherein the file system metadata structure is stored with file data within the storage device.

Example Clause R, the system of any one of Example Clause N through Q, wherein the relative reference for each of the plurality of nodes defines a range of the file metadata associated with a category of file metadata.

Example Clause S, the system of any one of Example Clause N through R, wherein each node of the plurality of nodes is appended to another zone of the storage device using the write buffer, the other zone being different than the zone.

Example Clause T, the system of any one of Example Clause N through R, wherein each node of the plurality of nodes is appended to the zone of the storage device using the write buffer.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different references).

In closing, although the various configurations have been described in language specific to structural features and/or methodological acts, the subject matter defined in the appended representations is not necessarily limited to the specific features or acts described. Rather, the specific features and acts are disclosed as example forms of implementing the claimed subject matter.

The invention claimed is:

1. A method for enabling file system software support for storing file metadata in an append-only zoned storage device, the method comprising:
receiving, by a processing system, a file system metadata structure for writing to the append-only zoned storage device, the file system metadata structure containing the file metadata and a plurality of nodes that organizes the file metadata;
determining that a quantity of data within the file system metadata structure meets or exceeds a threshold quantity of data; and
in response to determining that the quantity of data within the file system metadata structure meets or exceeds the threshold quantity of data:
arranging the file metadata and the plurality of nodes within a write buffer such that the file metadata is appended to the append-only zoned storage device prior to the plurality of nodes;
appending the file metadata to a zone within the append-only zoned storage device using the write buffer;
retrieving an offset of the file metadata within the zone relative to a starting position of the zone;
generating a relative reference for each node of the plurality of nodes by configuring each node of the plurality of nodes in the write buffer with the offset of the file metadata; and
appending each node of the plurality of nodes to the zone within the append-only zoned storage device using the write buffer, wherein the appending generates a file metadata layout that is compatible with the append-only zoned storage device.

2. The method of claim 1, wherein the file system metadata structure comprises a plurality of leaves containing the file metadata and a corresponding plurality of connected branches containing the plurality of nodes.

3. The method of claim 1, further comprising:
modifying the file metadata within the zone within the append-only zoned storage device in response to a change to associated file data; and
in response to modifying the file metadata, updating the relative reference for each node of the plurality of nodes with data defining the modification.

4. The method of claim 1, wherein the file system metadata structure is stored with file data within the append-only zoned storage device.

5. The method of claim 1, wherein the relative reference for each node of the plurality of nodes defines a range of the file metadata associated with a category of file metadata.

6. A system for enabling file system software support for storing file metadata in an append-only zoned storage device, the system comprising:
a processing system; and
a computer-readable medium having encoded thereon computer-readable instructions that when executed by the processing system cause the system to:
receive a file system metadata structure for writing to the append-only zoned storage device, the file system metadata structure containing the file metadata and a plurality of nodes that organize the file metadata;
determine that a quantity of data within the file system metadata structure is below a threshold quantity of data; and
in response to determining that the quantity of data within the file system metadata structure is below the threshold quantity of data:
generate a file metadata layout that is compatible with the append-only zoned storage device by configuring each node of the plurality of nodes with a relative reference defining a position of the file metadata in relation to a position of a respective node within the file metadata layout; and
append, using the relative reference configured for each of the plurality of nodes, the file metadata layout comprising the file metadata and the plurality of nodes of the file system metadata structure to a zone of the append-only zoned storage device.

7. The system of claim 6, wherein the file system metadata structure comprises a plurality of leaves containing the file metadata and a corresponding plurality of connected branches containing the plurality of nodes.

8. The system of claim 6, wherein the computer-readable instructions further cause the system to:
modify the file metadata within the zone of the append-only zoned storage device in response to a change to associated file data; and
in response to modifying the file metadata, update the relative references for each of the plurality of nodes with data defining the modification.

9. The system of claim 6, wherein the file system metadata structure is stored with file data within the append-only zoned storage device.

10. The system of claim 6, wherein the relative references of the plurality of nodes defines a range of the file metadata associated with a category of file metadata.

11. The system of claim 6, wherein appending the file metadata and the plurality of nodes of the file system metadata structure to the zone comprises a single write operation.

12. A system for enabling file system software support for storing file metadata in an append-only zoned storage device, the system comprising:
a processing system; and
a computer-readable medium having encoded thereon computer-readable instructions that when executed by the processing system cause the system to:
receive a file system metadata structure for writing to the append-only zoned storage device, the file system metadata structure containing the file metadata and a plurality of nodes that organizes the file metadata;
determine that a quantity of data within the file system metadata structure meets or exceeds a threshold quantity of data; and
in response to determining that the quantity of data within the file system metadata structure meets or exceeds the threshold quantity of data:
arrange the file metadata and the plurality of nodes within a write buffer such that the file metadata is appended to the append-only zoned storage device prior to the plurality of nodes;
append the file metadata to a zone within the append-only zoned storage device using the write buffer;
retrieve an offset of the file metadata within the zone relative to a starting position of the zone;
generate a relative reference for each node of the plurality of nodes by configuring each node of the plurality of nodes in the write buffer with the offset of the file metadata; and
append each node of the plurality of nodes to the append-only zoned storage device using the write buffer, wherein the appending generates a file metadata layout that is compatible with the append-only zoned storage device.

13. The system of claim 12, wherein the file system metadata structure comprises a plurality of leaves containing the file metadata and a corresponding plurality of connected branches containing the plurality of nodes.

14. The system of claim 12, wherein the computer-readable instructions further cause the system to:
modify the file metadata within the zone within the append-only zoned storage device in response to a change to associated file data; and
in response to modifying the file metadata, update the relative reference for each of the plurality of nodes with data defining the modification.

15. The system of claim 12, wherein the file system metadata structure is stored with file data within the append-only zoned storage device.

16. The system of claim 12, wherein the relative reference for each of the plurality of nodes defines a range of the file metadata associated with a category of file metadata.

17. The system of claim 12, wherein each node of the plurality of nodes is appended to another zone within the append-only zoned storage device using the write buffer, the other zone being different than the zone.

18. The system of claim 12, wherein each node of the plurality of nodes is appended to the zone within the append-only zoned storage device using the write buffer.

* * * * *